United States Patent [19]
Suzuki et al.

[11] Patent Number: 5,811,895
[45] Date of Patent: Sep. 22, 1998

[54] POWER SUPPLY CIRCUIT FOR USE WITH A BATTERY AND AN AC POWER ADAPTOR

[75] Inventors: Keiji Suzuki; Yohichi Kozasu, both of Kanagawa-ken, Japan

[73] Assignee: International Business Machines Corp., Armonk, N.Y.

[21] Appl. No.: 514,878

[22] Filed: Aug. 14, 1995

[30] Foreign Application Priority Data

Aug. 12, 1994 [JP] Japan ................................. 6-190259

[51] Int. Cl.$^6$ .................................................. H02J 7/04
[52] U.S. Cl. ........................ 307/125; 307/116; 307/127; 307/64; 307/66; 307/130; 320/34
[58] Field of Search .................................. 307/125, 116, 307/112, 64, 65, 66, 45, 130, 131, 127; 320/34, 32; 363/50, 34, 21, 19, 55–57, 95–98; 304/492; 323/246, 277, 282, 285

[56] References Cited

U.S. PATENT DOCUMENTS

| | | | |
|---|---|---|---|
| 4,272,806 | 6/1981 | Metzger | 363/21 |
| 4,494,179 | 1/1985 | Inokuchi et al. | 363/35 |
| 4,697,136 | 9/1987 | Ishikawa | 323/267 |
| 4,788,450 | 11/1988 | Wagner . | |
| 4,827,149 | 5/1989 | Yabe | 307/64 |
| 4,935,836 | 6/1990 | Labbus et al. | 361/15 |
| 4,994,981 | 2/1991 | Walker et al. | 364/492 |
| 5,254,930 | 10/1993 | Daly | 320/32 |
| 5,295,036 | 3/1994 | Yagi et al. | 361/79 |

FOREIGN PATENT DOCUMENTS

| | | | |
|---|---|---|---|
| 588569A | 3/1994 | European Pat. Off. | H02J 9/02 |
| 0204163 | 2/1990 | Japan | H02J 9/06 |

OTHER PUBLICATIONS

Electronic Design vol. 40, No. 8, pp. 47–50,52; Frank, Goodenough; synchronous. Rectifier UPS PC Battery Life, Apr. 16, 1992.

*Primary Examiner*—Richard T. Elms
*Assistant Examiner*—Albert W. Paladini
*Attorney, Agent, or Firm*—Martin J. McKinley

[57] ABSTRACT

A power supply circuit prevents, without the use of a series diode, the flow of reverse current from a battery to an AC power adaptor when the power adaptor is disconnected from its external power source. The circuit includes both voltage and current detectors to determine if the output voltage and current of the power adaptor are above or below predetermined reference levels. A summing circuit sums the outputs of the voltage and current detectors, and when both the detected voltage and current are below the reference levels, a switch disconnects the battery from the output terminal of the power adaptor, thereby preventing reverse current flow.

2 Claims, 5 Drawing Sheets

| | External power source | | Power only |
|---|---|---|---|
| | Battery not being charged | Battery being charged | |
| Output voltage of external power source $V_e$ | 20 VDC | 7.4～15 VDC | 0 VDC |
| Output voltage of external power source $I_e$ | 0～2.0 A | 2.4～3.4 A | 0 A |

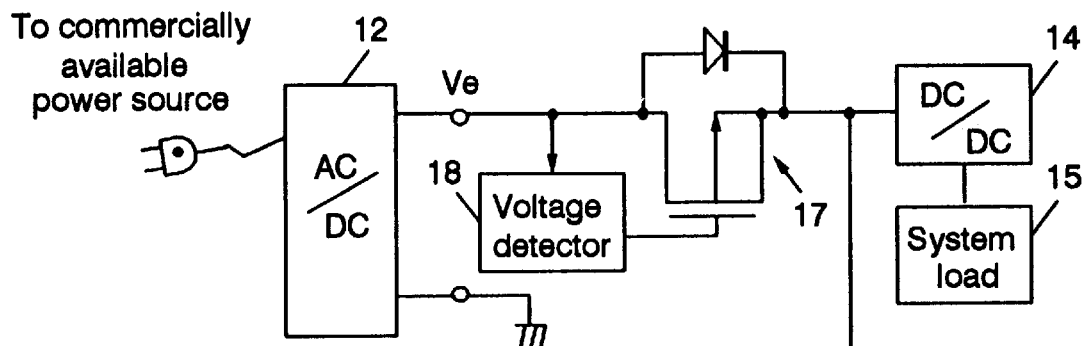
FIG. 5A PRIOR ART
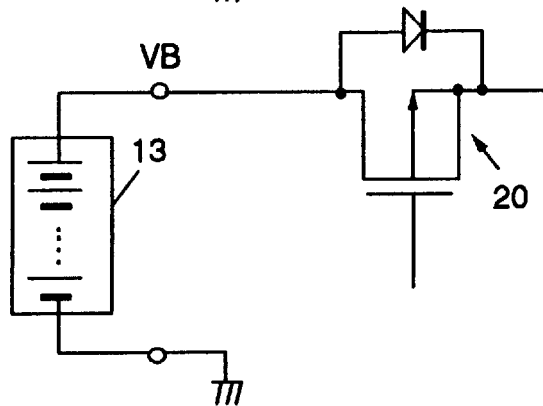
FIG. 5B PRIOR ART
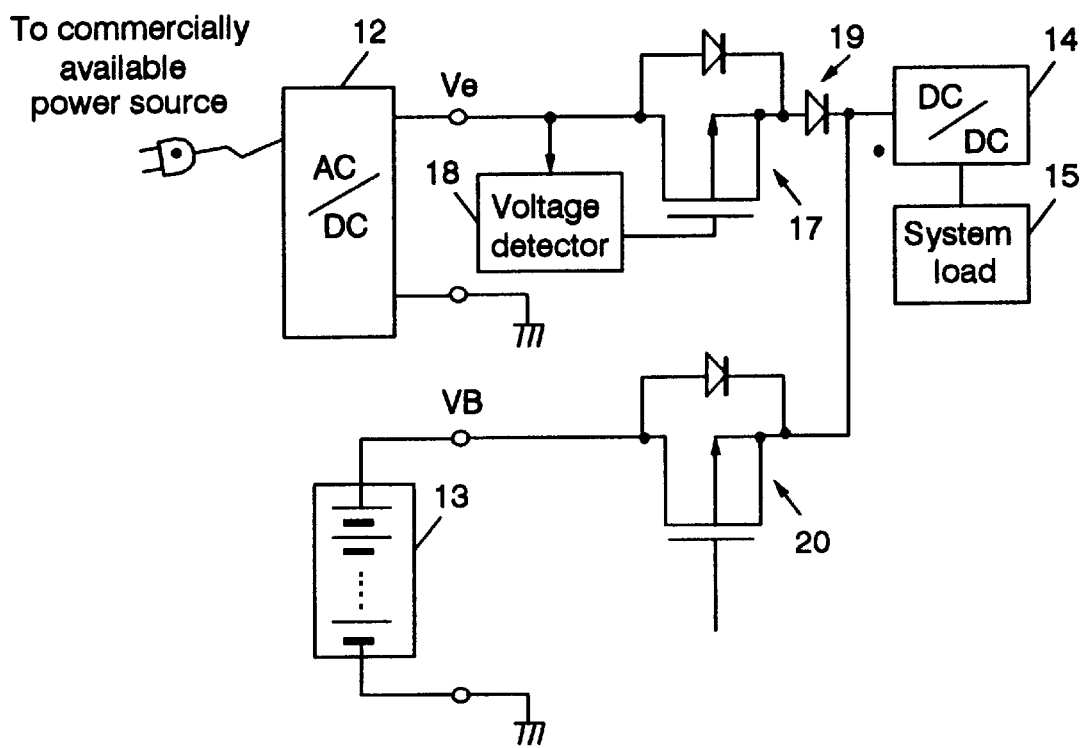

POWER SUPPLY CIRCUIT FOR USE WITH A BATTERY AND AN AC POWER ADAPTOR

BACKGROUND OF THE INVENTION

Applicants claim the foreign priority benefits under 35 U.S.C. 119 of Japanese Application No. 6-190259, which was filed in Japan on Aug. 12, 1994. This Japanese application and its translation are incorporated by reference into this application.

This invention pertains to electrical power supplies and, more particularly, to power supplies that use two power sources, such as a battery and an AC power adaptor.

FIG. 2 is a schematic diagram showing a general power supply unit for an electronic system. In FIG. 2, power for an electronic system 10 is supplied by an external power source through an AC/DC adaptor 12, or by a battery 13.

The AC/DC adaptor 12 is a device that converts an AC voltage from an external power source into a DC voltage. The positive power supply line of the AC/DC adaptor 12 is connected via an input terminal 11a to a DC/DC converter 14 within the electronic system 10. The negative power supply line of the AC/DC adaptor 12 is connected to a GND within the electronic system 10 via an input terminal 11b.

The AC/DC adaptor 12 is designed to be operated with an inherent output characteristic, such as CVCC (constant voltage-constant current) or CVVCCC (constant voltage-approximate constant power-constant current). The graph in FIG. 3A shows the current-voltage characteristic of the AC/DC adaptor 12 that is operated at 40 W in the CVCC mode. The graph in FIG. 3B shows the current-voltage characteristic of an AC/DC adaptor 12 that is operated at 40 W and in the CVVCCC mode. The characteristic, CVCC or CVVCCC, is determined by the capacity and charging/discharging characteristic of the battery 13 (which will be described later) that the electronic system 10 employs. When only an external power source supplies power (including when both the external power source and the battery 13 are connected, but the battery 13 is not charged), the AC/DC adaptor 12 shifts to the constant voltage area (CV). The output voltage of the AC/DC adaptor 12 is almost at the same level as an open-circuit voltage of 20 V (+5%, -10%) when the external power source is released from a system load 15, and current is increased or decreased according to the power consumption of the system load 15. When the AC/DC adaptor 12 charges the battery 13, the AC/DC adaptor 12 shifts to the constant current (CC) or the approximate constant power (VC) range. The output voltage of the AC/DC adaptor 12 at this time is 7.4 V to 15 V (7.4 V is the discharge termination voltage for the battery 13, while 15 V is the fully charged termination voltage). The battery 13 is, for example, a nickel cadmium (Ni—Cd) cell or a nickel metal hydride (Ni—MH) cell. The power supply line on the positive side of the battery 13 is connected to the electronic system 10 at an input terminal 11c, is electrically coupled with the power supply line on the positive side of the AC/DC adaptor 12, and is coupled to the DC/DC converter 14. The power supply line on the negative side of the batter 13 is connected to GND in the electronic system 10 via an input terminal 11d. Battery 13 generally comprises an arrangement of eight battery cells of about 1.2 V each connected in series. In this case, the output voltage of battery 13 is 7.4 V to 15 V, and does not exceed 16 V even at its maximum.

The DC/DC converter 14 is a device that controls the voltage that is supplied to the system load 15. More specifically, the DC/DC converter 14 is coupled to both the AC/DC adaptor 12 and the battery 13. The DC/DC converter 14 reduces the voltage (20 V) of the external power source (AC/DC adaptor 12), or the voltage (7.4 V to 15 V) of the battery 13, to a constant voltage level (normally, 5 V or 3.3 V) that is appropriate for the operation of the system load 15.

The system load 15 represents the component in the electronic system 10 that consumes power and is driven by constant DC voltage, which is supplied by the DC/DC converter 14. If the electronic system 10 is a notebook computer, then a CPU, a memory, a display, or individual peripherals are included as part of the system load 15.

In an electronic system that receives, in parallel, the output voltages of the AC/DC adaptor 12 and the battery 13, means are required to prevent the flow of a reverse current that would otherwise be caused by a voltage difference between the two power sources. In particular, when only the battery 13 is supplying power, means must be provided to prevent a current back flow from the power supply line of the battery 13 to the power supply line of the AC/DC adaptor 12. Such a current reversal would result in a wasteful power consumption by a circuit in the AC/DC adaptor 12, and the power of the battery 13, which has a finite capacity, would be expended uselessly. Power source detection means is sometimes provided on the power supply line on the positive side of the AC/DC adaptor 12 to detect the connection of an external power source. However, reverse current flow from the battery 13 may cause a power source detection means to incorrectly identify the presence of the external power source.

The following two examples describe prior art circuits for preventing a reverse current flow from the battery 13 to the AC/DC adaptor 12.

In the first example, a diode is inserted into the power supply line of the AC/DC adaptor 12 to prevent a reverse current flow. As illustrated in FIG. 4A, a diode 16 for preventing current back flow is connected between the positive terminal of the AC/DC adaptor 12, and the positive terminal of the battery 13. The diode 16 is connected such that the normal direction of current flow is from the AC/DC adaptor 12 to the DC/DC converter 14. Therefore, when the output voltage of the battery 13 is higher than that of the AC/DC adaptor 12, a back flow of current into the AC/DC adaptor 12 can be prevented.

Suppose that diode 16 is Schottky barrier diode or a fast recovery diode. Since the voltage drop $V_f$ in the forward direction for the Schottky barrier diode is relatively low (0.4 V to 0.5 V), this diode can effectively reduce the power that is wasted. However, at a high temperature, reverse current through the Schottky diode is increases, so that the prevention of reverse current flow is not effective. Therefore, a Schottky barrier diode is not suitable for diode 16. On the other hand, although the voltage drop of a fast recovery diode in the forward direction is large (0.8 V to 1.0 V), current back flow is substantially lower when compared with that for a Schottky barrier diode, even at high temperatures. Thus, a fast recovery diode can be used for diode 16. A fast recovery diode, however, may become overheated because the voltage drop in the forward direction causes considerable power consumption. For example, with a 40 W CVVCCC AC/DC adaptor 12 outputing a current of 3 A, the power consumed by a fast recovery diode is 2.4 W to 3.0 W (3 A ×0.8 V to 1.0 V), such that a heat sink or a metal plate is required. Although, as shown in FIG. 4B, the heat generated can be dissipated by using a plurality of fast recovery diodes 16 connected in parallel, this arrangement does not provide enough heat dissipation, and a design that incorporates additional heat sinking is required.

Since there is a standard component available that consists of a single chip on which two fast recovery diodes are connected in parallel, an arrangement of two or four diodes can be used that involves the employment one or two such chips. However, it is not economical to employ a plurality of expensive diode chips.

In the second example, a connection/disconnection or switch means is provided on the power supply line of the AC/DC adaptor 12 to prevent current back flow. As illustrated in FIG. 5A, a FET switch 17 (e.g., P-channel power $MOS_{13}$ FET) is connected between the positive terminal of the AC/DC adaptor 12 and the input terminal of the DC/DC converter 14. The FET switch 17 is turned ON when an external power source supplies power via the AC/DC adaptor 12 to the system load 15, or when the battery 13 is to be charged. The FET switch 17 is turned OFF when only the battery 13 is supplying power. Thus, current back flow to the AC/DC adaptor 12 is prevented.

In this example, a circuit must be provided that monitors the voltage of the external power source and turns the switch 17 ON or OFF. As illustrated in FIG. 5A, a voltage detector 18 is connected to the positive terminal of the AC/DC adaptor 12 to monitor the output voltage of the external power source. The voltage detector 18 is also connected to the FET switch 17 to turn it ON or OFF. More specifically, the voltage detector 18 compares the output voltage $V_e$ of the AC/DC adaptor 12 with a predetermined reference voltage $V_{ref}$. When $V_e$ is equal to or greater than $V_{ref}$, the voltage detector 18 concludes that a voltage from an external power source has been applied, and turns FET switch 17 ON. When $V_e$ is lower than $V_{ref}$, the voltage detector 18 concludes that a voltage from the external power source has not been applied, and turns FET switch 17 OFF.

When the system load 15 is driven by the external power source, the output voltage $V_e$ of the AC/DC adaptor 12 of a CVCC or CVVCCC system may have a considerably higher voltage (20 V, e.g.) than the output voltage of the battery 13. When the battery 13 is to be charged, the output voltage $V_e$ is shifted to almost the same voltage as the battery output voltage. Actually, the voltage at the battery terminal is 7.4 V to 15 V, as is illustrated in FIGS. 3A and 3B. Thus, even if the system is powered by the external power source, the output voltage $V_e$ of the AC/DC adaptor 12 is varied over a wide range from the charging start voltage (7.4 V) to the constant output voltage (20 V). Therefore, to determine whether or not the voltage is applied by the external power supply, the reference voltage $V_{ref}$ must be set lower than 7.4 V, which is the minimum value of $V_B$.

A property of the FET switch 17 is that a current flows bidirectionally in the ON state. If the external power source is detached while both the external power supply and the battery 13 are being operated, the battery voltage $V_B$ is coupled to the input side of the voltage detector 18 via the FET switch 17. Therefore, the voltage detector 18 keeps the FET switch 17 in the ON state. As is illustrated in FIG. 5B, a diode 19 for preventing reverse current flow is inserted between the FET switch 17 and the battery terminal. The diode 19 may be either a Schottky barrier diode or a fast recovery diode. With the employment of a Schottky barrier diode, the reverse current can be cut off by the FET switch 17. Therefore, a Schottky barrier diode that has a small voltage drop in the forward direction is adequate for use as diode 19. A Schottky barrier diode, however, still has a voltage drop of 0.4 V to 0.5 V in the forward direction and, with an operation current of 3 A, there is a power consumption of 1.2 W to 1.5 W (3 A ×0.4 V to 0.5 V). The design of a heat discharge means, however, continues to be a problem.

In summary, in prior art examples 1 and 2 a fast recovery diode or a Schottky barrier diode is employed to prevent a reverse current flow from the battery 13 to the AC/DC adaptor 12 in the two prior art examples discussed above. Since each of these diodes is a heat generator, a means to discharge this heat is required.

In FIGS. 4 and 5, a P-channel power MOS_FET 20 is inserted in the supply line of the battery 13 before the supply line is coupled to the supply line of the AC/DC adaptor 12. The FET switch 20 is employed to control the charging/discharging of the battery 13. More specifically, when the battery 13 is to be recharged by the external power source, or when the battery 13 supplies power to the system load 15, the FET switch 20 is turned ON; otherwise, the FET switch 20 is turned OFF. The ON/OFF control of the FET switch 20 is performed in the some manner by a dedicated processor that, for example, monitors the remaining capacity of the battery 13, its temperature, and the connection or removal of the external power source. The charging and discharging of the battery 13 is not included within the scope of the subject matter of the present invention, and a detailed explanation for the switching operation of the FET 20 will not be given.

SUMMARY OF THE INVENTION

Briefly, the invention is a power supply circuit for use with a battery and a power adaptor. The power supply circuit includes a voltage detector for detecting a voltage of the power adaptor in excess of a predetermined reference voltage. A current detector for detecting a current of the power adaptor in excess of a predetermined reference current is also included. A switch is provided for coupling the power adaptor to, and disconnecting the power adaptor from, the battery. A summer for turning the switch OFF when the voltage of the power adaptor (as detected by the voltage detector) is below the reference voltage, and when the current of the power adaptor (as detected by the current detector) is below the reference current. Thus, the voltage and current detectors detect when the power adaptor has been disconnected from its external power source, and the summer turns the switch OFF, thereby preventing the back flow of current from the battery into the power adaptor.

BRIEF DESCRIPTION OF THE DRAWINGS

FIGS. 5A and 5B are diagrams of prior art power supply circuits having FET switches to prevent reverse current flow.

DESCRIPTION OF THE ILLUSTRATIVE EMBODIMENTS

Figure 1:
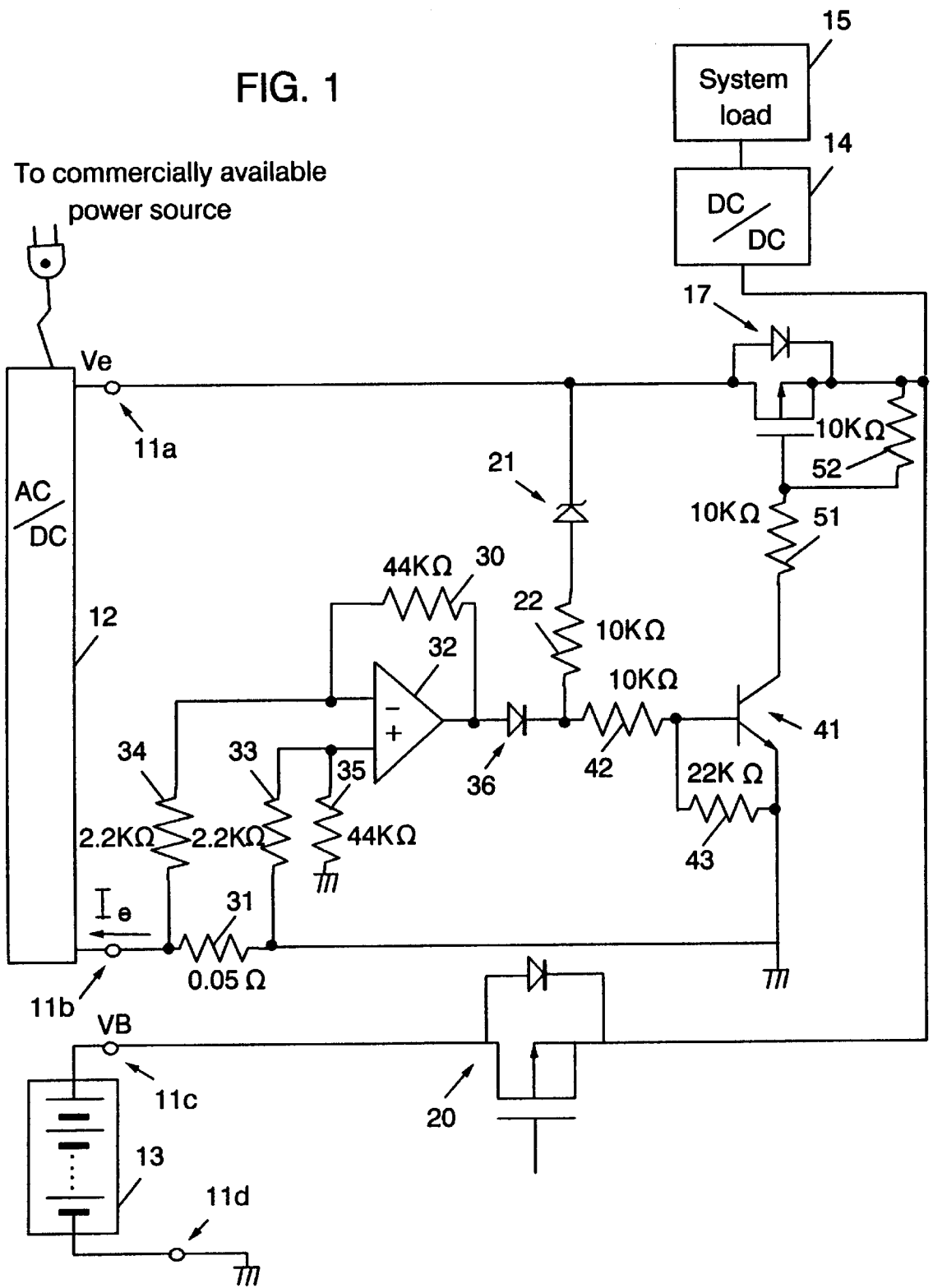
FIG. 1 is a schematic diagram illustrating a power supply in an electronic system according to one embodiment of the present invention.
Figures 2, 6:
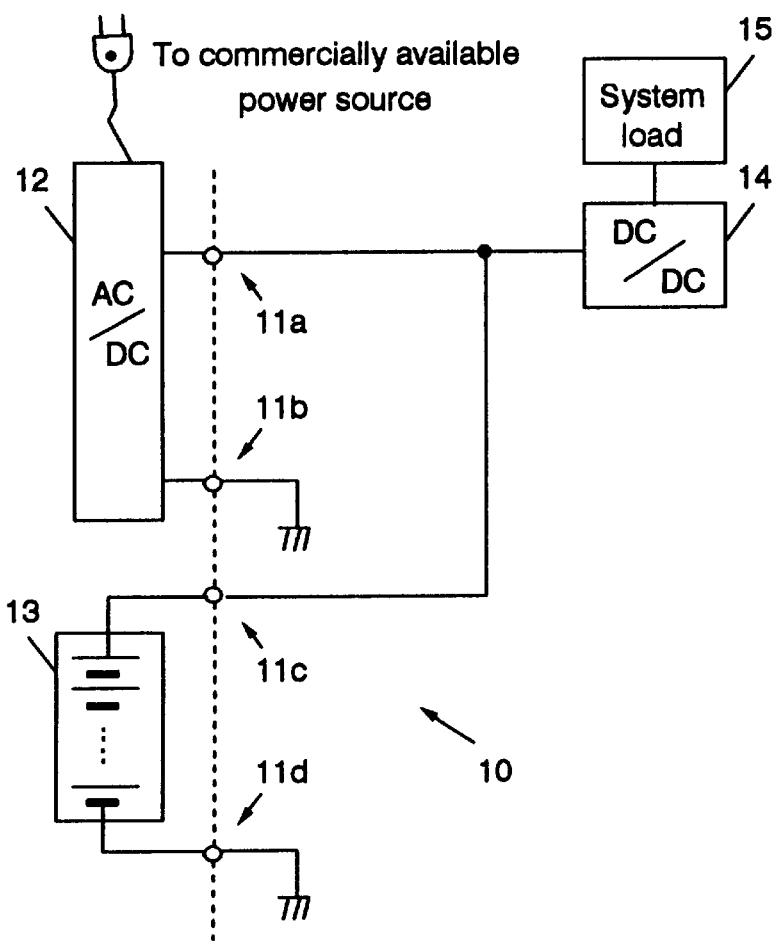
FIG. 2 is a block diagram of a general power supply in an electronic system.
FIG. 6 is a table showing the output voltage and output current of the external power source as a function of the mode of operation.

FIG. 1 is a schematic diagram showing a power supply unit of an electronic system according to one embodiment of the present invention. The reference numbers that are used to denote components in FIG. 2 are also employed to denote corresponding or identical components in FIG. 1.

The power supply unit in this embodiment comprises an AC/DC adaptor 12; a battery 13; a DC/DC adaptor 14; voltage detection means for detecting an output voltage $V_e$ of an external power source; current detection means for detecting an output current $I_e$ of the external power source; logical sum means for outputting a logical sum of the detection results of the voltage detection means and the current detection means; and connection/disconnection means for connecting and disconnecting the input of the external power source in response to the output of the logical sum means. First, the structure of the individual components will be described.

Voltage Detector

The voltage detection is provided by a Zener diode 21 on the positive power supply line of the AC/DC adaptor 12. A general characteristic of a Zener diode is that a reverse current flows when a voltage that is equal to or greater than the Zener voltage $V_z$ is applied to the diode in the reverse direction. In this embodiment, the Zener diode 21 that has a Zener voltage $V_z$ of 15 V. When the output voltage $V_e$ of the AC/DC adaptor 12 is 17 V or greater, the output of the voltage detection means is active. Thus, the reference voltage $V_{ref}$ is set to 17 V, which is between the open-circuit voltage of the external power source (20 V +5%, –10%, with a minimum value of about 18 V) and the output voltage $V_B$ of the battery 13 (the voltage at the battery terminal being 7.4 V to 15 V, with a maximum value of 16 V). Thus, when the external power source is disconnected and only the battery 13 is supplying power, or when the AC/DC adaptor 12 is charging the battery 13 in the CC mode or in the VC mode, all output by the voltage detection means is inhibited. When the AC/DC adaptor 12 is in the CV mode, the output of the voltage detection means is active. The output of the voltage detector is coupled to the logical sum means through a 10 K-Ohms resistor 22, which protects the diode 21 from excessive current.

Current Detector

The current detection means in this embodiment includes a 0.05 Ohms,current detection resistor 31 and an operational amplifier or "op amp" 32. The current detection resistor 31 is connected in series with the power supply line on the negative side of the AC/DC adaptor 12, so that it converts the output current $I_e$ into a voltage value that is proportional to the current.

One end of the current detection resistor 31 (GND side) is connected via a 2.2 K-Ohms resistor 33 to the non-inverting input of op amp 32. The other end of the current detection resistor 31 (negative side) is connected via a 2.2 K-Ohms resistor 34 to the inverting input of op amp 32. With this arrangement, op amp 32 amplifies the voltages at both ends of the current detection resistor 31. Further, the non-inverting input is connected to GND via a 44 K-Ohms resistor 35, and the output of op amp 32 is fed back to the inverting input via a 44 K-Ohms resistor 30. Therefore, the voltage gain of the overall op amp circuit 32 is 20 and the voltage to output current gain is 1.0 V/A. For example, when an output current of 1.7 A is flowing through the current detection resistor 31, the output of op amp 32 is 1.7 V. The output of the current detector is coupled to the summing circuit via diode 36.

Since the current detection means uses the output current of the external power source, this may be employed to control the charge operation of the battery 13. In addition, the diode 36 is employed to avoid an erroneous detection of output current $I_e$ when a current from the Zener diode 21 flows back to op amp 32 while the AC/DC adaptor 12 is in the CV mode. In this embodiment, a small-signal silicon diode is employed as the diode 36.

Logical Sum Means

The logical sum means in this embodiment is an NPN transistor 41. The outputs of the voltage detection means and the current detection means are connected together, and are voltage-divided by a 10 K-Ohms resistor 42 and a 2K K-Ohms resistor 43, with the resultant output being sent to the base of transistor 41. The emitter of the transistor 41 is connected to ground GND, and the collector is connected to the switch means. When the output voltage $V_e$ of the AC/DC adaptor 12 (the voltage at the input terminal 11$a$) exceeds the reference voltage, 17 V, transistor 41 is switched ON. The output of the current detection means is affected by the voltage drop in the forward direction by diode 36. When the output current $I_e$ of the AC/DC adaptor 12 exceeds the reference current $I_{ref}$, 1.7 A, transistor 41 is switched ON.

When either the output voltage $V_e$, or the output current $I_e$, of the AC/DC adaptor 12 exceeds a predetermined reference voltage $V_{ref}$ or the reference current $I_{ref}$, the base potential of the transistor 41 exceeds a threshold value, and the transistor 41 is switched ON. When neither the output voltage $V_e$ nor the output current $I_e$ of the AC/DC adaptor 12 attains the reference voltage $V_{ref}$ or the reference current $I_{ref}$, the transistor 41 is switched OFF (i.e., it is determined that no power is being supplied from the external power source). In other words, the summer performs a logical sum of the results of the voltage detection means and the current detection means to determine whether or not the external power source is supplying power.

The Switch

The connection/disconnection means or switch in this embodiment is a P-channel power MOSFET transistor 17. The collector of transistor 41 is connected to the gate of FET switch 17 via a 10 K-Ohms resistor 51. The positive terminal of the AC/DC adaptor 12 is connected to the drain of FET switch 17, while the positive terminal of battery 13 is connected to its source. A 22 K-Ohms resistor 52 is connected between the gate and the source of FET 17. The bias voltage between the gate and the source is determined by the voltage divider composed of resistors 51 and 52.

When the transistor 41 is switched ON (i.e., the summer indicates that a voltage has been applied by the external power source), a current flows from the positive terminal of the AC/DC adaptor 12, toward a parasitic diode of the FET 17, the resistors 52 and 51, and the transistor 41. A bias voltage is then applied between the gate and source, and FET switch 17 is turned ON. Accordingly, the AC/DC adaptor 12 that was connected only through the parasitic diode of FET switch 17 is now fully connected, with FET switch 17 being switched ON. The ON resistance between the drain and the source of the FET 17 is at most 50 M-Ohms. Even when the output current $I_e$ of the AC/DC adaptor 12 is at the maximum of 3.4 A, the power consumed by the FET 17 is only approximately 0.05 Ohms×(3.4 A)=O 0.6 W. Therefore, it should be understood that less power is wasted than when using the fast recovery diode or Schottky barrier diode circuit to prevent a reverse current.

When the transistor 41 is switched OFF (i.e., the logical summer does not indicate that a voltage has been applied by the external power source), the gate of FET 17 is cut off and there is no current path to the resistor 52. The bias voltage is not applied between the gate and the source, and the FET switch 17 is turned off. Accordingly, a current flow from the battery 13 to the AC/DC adaptor 12 is interrupted, so that a current back flow from the battery 13 to the AC/DC adaptor 12 will not occur.

Power Supply Operation

The operation of the power supply unit will be explained with reference to Table 1. Table 1 shows the output voltage $V_e$ (equivalent to the voltage at the input terminal 11$a$) and the output current $I_e$ of the external power source during the individual operations. It should be noted that, in this embodiment, the AC/DC adaptor 12 is a CVVCCC system with a 20 V DC (direct current) 40 W output, and that battery 13 includes eight cells connected in series.

There are two major modes of power supply operation; specifically, external power source and battery operational modes. When the external power source is being used, its operation can be further divided into two categories; specifically, a first mode in which the battery 13 is not being charged, and a second mode wherein the battery is being charged.

When the external power source is active and the battery 13 is not being charged, the AC/DC adaptor 12 is operated in the CV mode (as is described above), and the output voltage $V_e$ of the external power source (voltage at the input terminal 11$a$) is 20 VDC, which is higher than the reference voltage $V_{ref}$ (17 V). The output of the voltage detection means is active or a logical "1". The output current $I_e$ shifts between 0 A and 2.0 A according to the needs of the system load 15. More specifically, since the output current $I_e$ changes before and after the reference current $I_{ref}$ (1.7 A), the output of the current detection means can be "0" or "1". In this case, the logical summer outputs a "1", which is the logical sum of the outputs of both detection means. In response to this output, the switch maintains the connection between the external power source and the load.

Figure 3A:
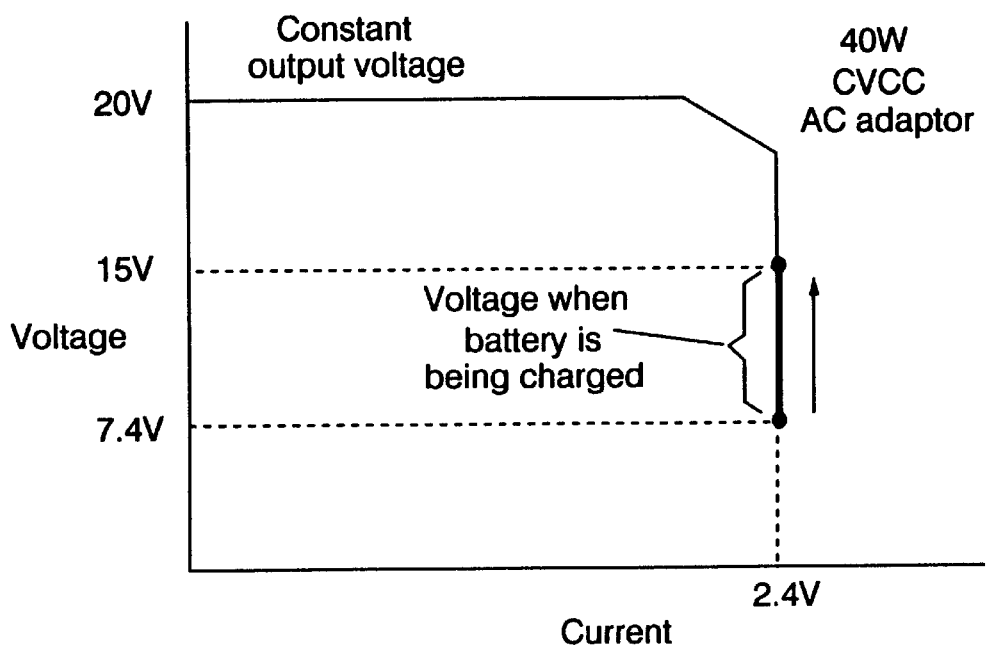
FIGS. 3A and 3B are graphs showing the operational characteristic of, respectively, a CVCC and CVVCCC an AC/DC adapters.
Figure 3B:
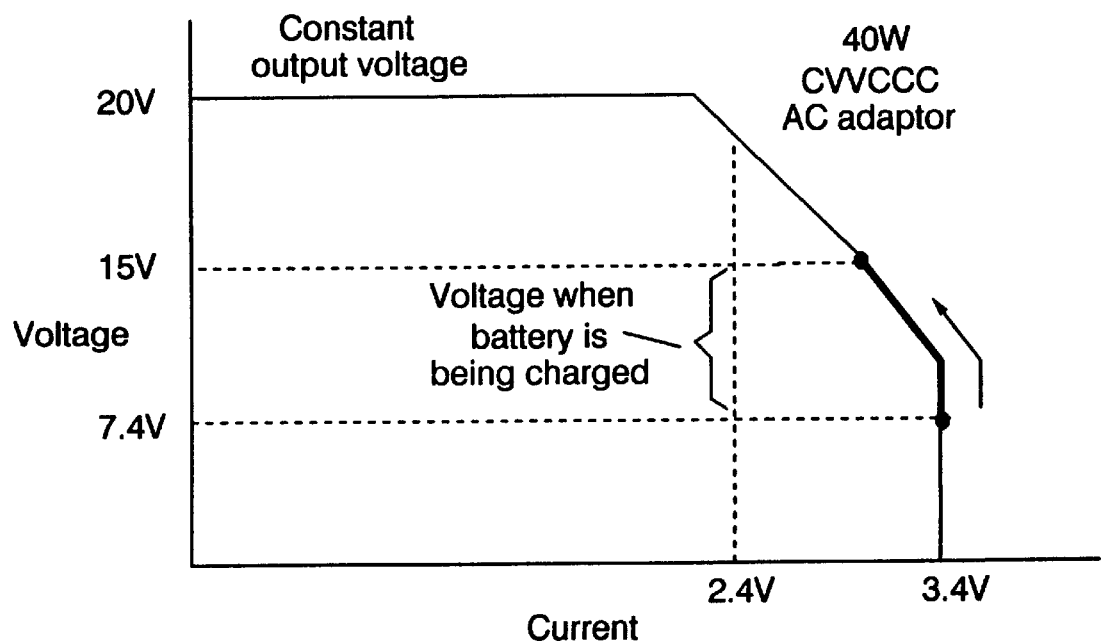
Figure 4A:
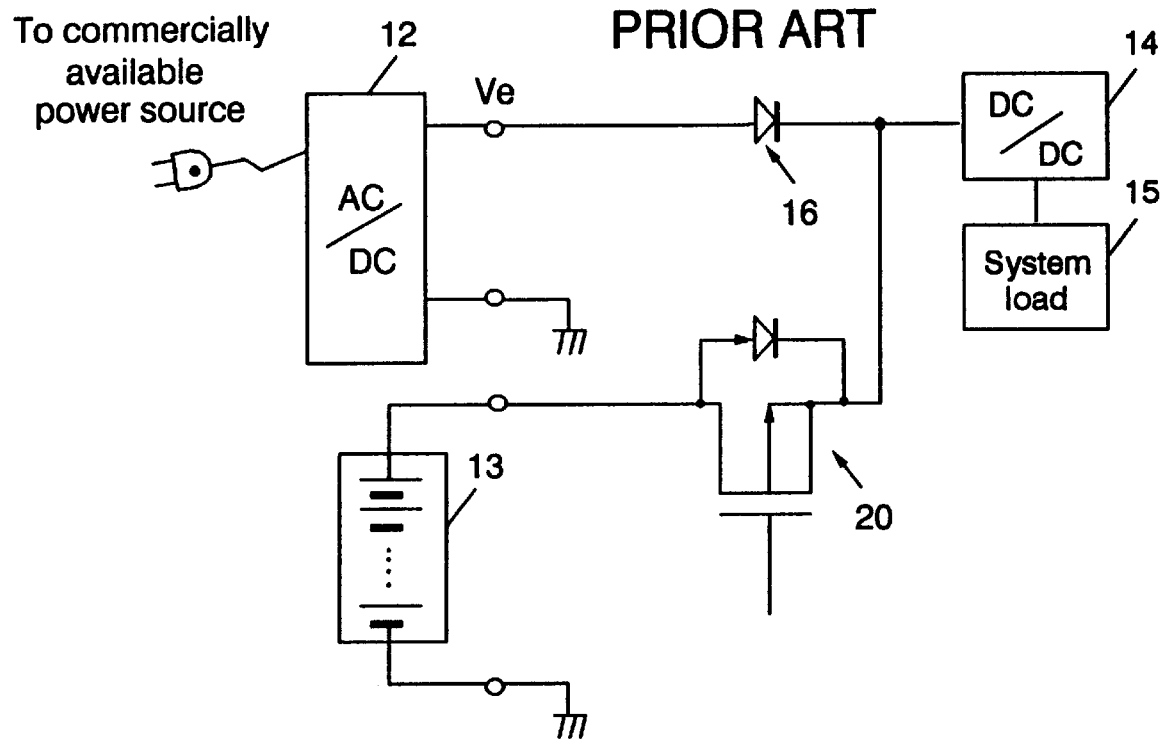
FIGS. 4A and 4B are diagrams of prior art power supply circuits having diodes to prevent reverse current flow.
Figure 4B:
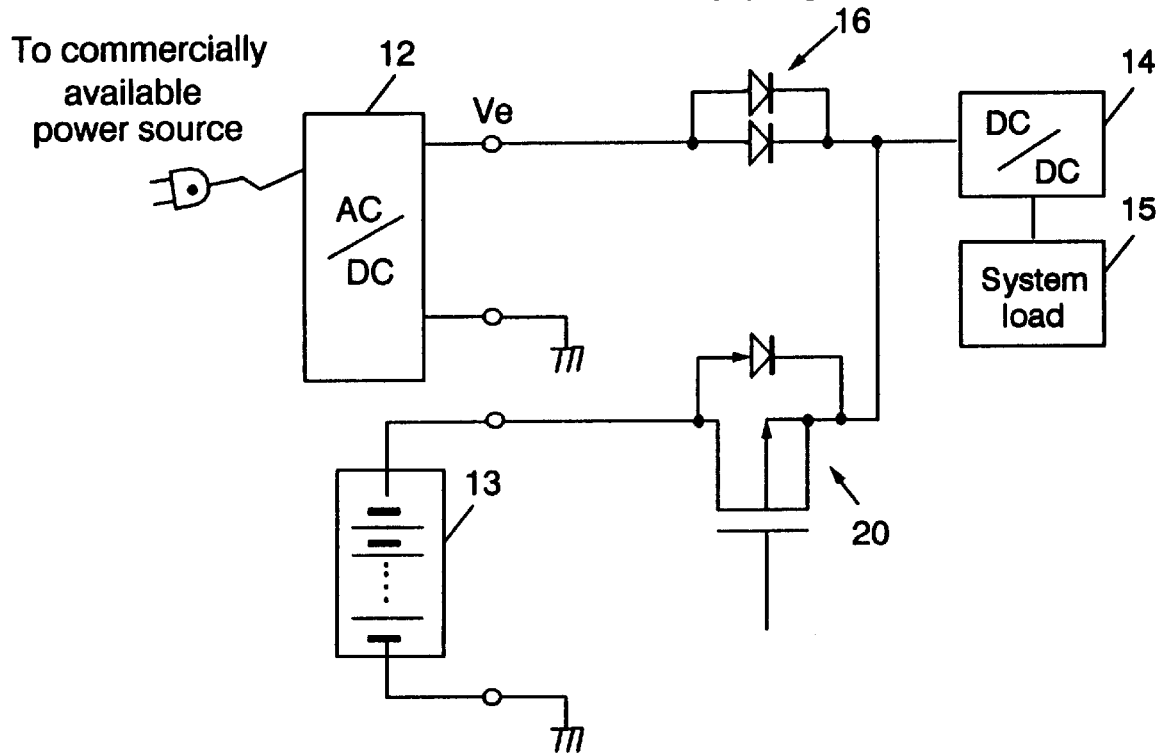

When the battery 13 is being charged by the external power source, the AC/DC adaptor 12 is operated in the VC mode or the CC mode (as is described above), the output voltage $V_e$ of the external power source is shifted between 7.4 V and 15 V DC, which is the charging voltage of the battery 13. More specifically, since the output voltage $V_e$ is below the reference voltage $V_{ref}$, the output of the voltage detection means is a logical "0". The output current $I_e$ during the charging process is 2.4 A to 3.4 A (see FIG. 3B), which is greater than the reference current $I_{ref}$. Therefore, the output of the current detection means is a logical "1". In this case, the logical sum means outputs a logical "1", which is the logical sum of the outputs of both detection means. In response to this output, the switch means maintains the connection of the external power source.

When only the battery 13 is active, the external power source is normally separated from the electronic system 10. The voltage $V_e$ at the terminal 11$a$ is 0 V DC, and the current $I_e$ that is returned to the terminal 11$b$ is 0 A. The outputs of the voltage detection means and the current detection means are both "0", and, accordingly, the output of the logical sum means is "0". In response to this output, the switch disconnects the input terminal 11$a$ of the AC/DC adaptor 12 from the input terminal 11$c$ of the battery 13 (more specifically, these terminals are connected only by the parasitic diode of the FET switch 17). The output current of the battery 13 does not flow back to the AC/DC adaptor 12.

Although the external power source is active while the battery 13 is being charged, the output of the voltage detector has already dropped to "0". When the external power source is removed, the flow of output current $I_e$ is halted, the output of the current detection means is "0" and, accordingly, the output of the summer goes to "0". This, in turn, shuts OFF switch 17. Since the reference voltage $V_{ref}$ of the voltage detection means is set higher than the maximum output voltage of the battery 13, the output of the voltage detector cannot be a logical "1", even if the output current of the battery 13 flows inversely across the FET switch 17. Therefore, a diode (e.g., the diode 19 in FIG. 5B) for preventing reverse current flow is not required.

The present invention has been described while referring to the preferred embodiment. It should however be obvious to one having ordinary skill in the art that the embodiment may be corrected or modified without exceeding the scope of the subject of the present invention. In other words, the present invention is disclosed by using an example, and it should not be considered as being limited to the above described embodiment. To understand the subject of the present invention, the following claims should be referred to.

As described in detail, according to the present invention, it is possible to provide a power supply unit that can properly prevent a reverse current flow from a battery to an external power source and that can be employed for an electronic system, such as a notebook computer, which is activated by both an external power source and an incorporated battery, and to provide a method for controlling such a power supply unit.

Further, according to the present invention, since a diode for preventing a reverse current flow, such as a Schottky barrier diode or a fast recovery diode, is not required, a heat discharge means can be easily designed and manufacturing costs can be reduced. Although the preferred use of the present invention is with an AC power adaptor and a battery, it should be understood that the invention may also be used with other types of power sources, not just batteries and power adapters. Accordingly, the use of the terms "battery" and "power adaptor" in the specification and claims should be broadly interpreted to include other types of electrical power sources.

We claim:

1. A power supply circuit for use with a battery and a power adaptor, said power supply circuit comprising:

a voltage detector for detecting a voltage of the power adaptor below a predetermined reference voltage;

a current detector for detecting a current of the power adaptor below a predetermined reference current;

a switch for coupling the power adaptor to, and disconnecting the power adaptor from, the battery; and a circuit for switching said switch OFF in response to the voltage of the power adaptor, as detected by said voltage detector, being below said reference voltage, and in response to the current of said power adaptor, as detected by said current detector, being below said reference current.

2. A battery powered computer system, comprising:

a system load including a CPU, a memory, a display and a peripheral;

a battery for powering said system load;

a power adaptor;

a voltage detector for detecting a voltage of said power adaptor below a predetermined reference voltage;

a current detector for detecting a current of said power adaptor below a predetermined reference current;

a switch for coupling said power adaptor to, and disconnecting said power adaptor from, said battery; and a circuit for switching said switch OFF in response to the voltage of said power adaptor, as detected by said voltage detector, being below said reference voltage, and in response to the current of said power adaptor, as detected by said current detector, being below said reference current.

* * * * *